(12) United States Patent
Bian

(10) Patent No.: US 11,808,995 B2
(45) Date of Patent: Nov. 7, 2023

(54) EDGE COUPLERS WITH NON-LINEAR TAPERS

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 3 days.

(21) Appl. No.: 17/707,403

(22) Filed: Mar. 29, 2022

(65) Prior Publication Data

US 2023/0314730 A1 Oct. 5, 2023

(51) Int. Cl.
*G02B 6/42* (2006.01)
*G02B 6/122* (2006.01)
*G02B 6/12* (2006.01)

(52) U.S. Cl.
CPC ......... *G02B 6/4203* (2013.01); *G02B 6/1228* (2013.01); *G02B 6/12002* (2013.01); *G02B 2006/12152* (2013.01)

(58) Field of Classification Search
None
See application file for complete search history.

(56) References Cited

U.S. PATENT DOCUMENTS

| | | | |
|---|---|---|---|
| 4,932,032 A * | 6/1990 | Koch | H01S 5/1032 372/50.1 |
| 9,703,038 B1 * | 7/2017 | Chen | G02B 6/14 |
| 9,759,864 B2 * | 9/2017 | Painchaud | G02B 6/00 |
| 10,126,500 B2 | 11/2018 | Qi et al. | |
| 10,197,731 B2 | 2/2019 | Teng et al. | |
| 10,663,663 B2 * | 5/2020 | Painchaud | G02B 6/1228 |
| 11,181,760 B2 * | 11/2021 | Zhang | G02B 6/1228 |
| 2017/0017034 A1 | 1/2017 | Painchaud et al. | |

OTHER PUBLICATIONS

Pavel Cheben et al., "Refractive index engineering with subwavelength gratings for efficient microphotonic couplers and planar waveguide multiplexers," Optics Letter 35, 2526-2528 (2010).
T. Barwicz et al., "An o-band metamaterial converter interfacing standard optical fibers to silicon nanophotonic waveguides," 2015 Optical Fiber Communications Conference and Exhibition (OFC), pp. 1-3, doi: 10.1364/OFC.2015.Th3F.3 (2015).
M. Teng et al., "Trident Shape SOI Metamaterial Fiber-to-Chip Edge Coupler," 2019 Optical Fiber Communications Conference and Exhibition (OFC), pp. 1-3, Tu2J.6 (2019).
Kuanping Shang et al., "Silicon nitride tri-layer vertical Y-junction and 3D couplers with arbitrary splitting ratio for photonic integrated circuits," Opt. Express 25, 10474-10483 (2017).

(Continued)

*Primary Examiner* — Omar R Rojas
(74) *Attorney, Agent, or Firm* — Thompson Hine LLP; Anthony Canale

(57) ABSTRACT

Structures for an edge coupler and methods of fabricating such structures. The structure includes a back-end-of-line stack located over a substrate. The back-end-of-line stack includes a waveguide core having a longitudinal axis and a tapered section with a width that varies with position along the longitudinal axis based on a non-linear function.

20 Claims, 6 Drawing Sheets

(56) References Cited

OTHER PUBLICATIONS

R. S. Tummidi and M. Webster, "Multilayer Silicon Nitride-Based Coupler Integrated into a Silicon Photonics Platform with <1 dB Coupling Loss to a Standard SMF over O, S, C and L Optical Bands," 2020 Optical Fiber Communications Conference and Exhibition (OFC), pp. 1-3, Th2A.10 (2020).

Mu, Xin & Wu, Sailong & Cheng, Lirong & Fu, H. Y. "Edge Couplers in Silicon Photonic Integrated Circuits: A Review." Applied Sciences. 10. 1538. 10.3390/app10041538 (2020).

Martin Papes et al., "Fiber-chip edge coupler with large mode size for silicon photonic wire waveguides," Opt. Express 24, 5026-5038 (2016).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

Y. Bian et al., "3D Integrated Laser Attach Technology on 300-mm Monolithic Silicon Photonics Platform," 2020 IEEE Photonics Conference (IPC), pp. 1-2, doi: 10.1109/IPC47351.2020.9252280 (2020).

B. Peng et al., "A CMOS Compatible Monolithic Fiber Attach Solution with Reliable Performance and Self-alignment," In Optical Fiber Communication Conference (OFC), OSA Technical Digest (Optica Publishing Group, 2020), paper Th3I.4 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).

Y. Bian et al., "Hybrid III-V laser integration on a monolithic silicon photonic platform," in Optical Fiber Communication Conference (OFC), P. Dong, J. Kani, C. Xie, R. Casellas, C. Cole, and M. Li, eds., OSA Technical Digest (Optica Publishing Group, 2021), paper M5A.2 (2021).

Y. Bian et al., "Integrated Laser Attach Technology on a Monolithic Silicon Photonics Platform," 2021 IEEE 71st Electronic Components and Technology Conference (ECTC), pp. 237-244, doi: 10.1109/ECTC32696.2021.00048 (2021).

Y. Bian et al., "Monolithically integrated silicon nitride platform," 2021 Optical Fiber Communications Conference and Exhibition (OFC), 2021, pp. 1-3, paper Th1A.46 (2021).

Bian, Yusheng et al., "Edge Couplers in the Back-End-of-Line Stack of a Photonics Chip" filed on Jan. 19, 2021 as a U.S. Appl. No. 17/151,955.

Bian, Yusheng et al., "Metamaterial Edge Couplers in the Back-End-of-Line Stack of a Photonics Chip" filed on Feb. 11, 2021 as a U.S. Appl. No. 17/173,639.

\* cited by examiner

EDGE COUPLERS WITH NON-LINEAR TAPERS

BACKGROUND

The disclosure relates to photonics chips and, more specifically, to structures for an edge coupler and methods of fabricating such structures.

Photonics chips are used in many applications and systems including, but not limited to, data communication systems and data computation systems. A photonics chip integrates optical components, such as waveguides, photodetectors, modulators, and optical power splitters, and electronic components, such as field-effect transistors, into a unified platform. Among other factors, layout area, cost, and operational overhead may be reduced by the integration of both types of components on the same chip.

An edge coupler, also known as a spot-size converter, is commonly used for coupling light of a given mode from a light source, such as a laser or an optical fiber, to optical components on the photonics chip. The edge coupler may include a section of a waveguide core that defines an inverse taper having a tip. In the edge coupler construction, the narrow end of the inverse taper provides a facet at the tip that is positioned adjacent to the light source, and the wide end of the inverse taper is connected to another section of the waveguide core that routes the light to the optical components of the photonics chip.

The gradually-varying cross-sectional area of the inverse taper supports mode transformation and mode size variation associated with mode conversion when light is transferred from the light source to the edge coupler. The tip of the inverse taper is unable to fully confine the incident mode received from the light source because the mode size is considerably larger than the cross-sectional area of the tip. Consequently, a significant percentage of the electromagnetic field of the incident mode is distributed about the tip of the inverse taper. As its width increases, the inverse taper can support the entire incident mode and confine the electromagnetic field.

Conventional edge couplers may be susceptible to significant leakage loss of light to the substrate during operation. The leakage loss may include a significant contribution from the mismatch between the large mode size and the small cross-sectional area of the tip of the edge coupler. The leakage loss may be particularly high when coupling light of the transverse magnetic polarization mode from a single-mode optical fiber to a silicon nitride waveguide core.

Improved structures for an edge coupler and methods of fabricating such structures are needed.

SUMMARY

In an embodiment of the invention, a structure for an edge coupler is provided. The structure comprises a substrate and a back-end-of-line stack located over the substrate. The back-end-of-line stack includes a waveguide core having a longitudinal axis and a tapered section with a width that varies with position along the longitudinal axis based on a non-linear function.

In an embodiment of the invention, a method of forming a structure for an edge coupler is provided. The method comprises forming a back-end-of-line stack located over a substrate. The back-end-of-line stack includes a waveguide core having a longitudinal axis and a tapered section with a width that varies with position along the longitudinal axis based on a non-linear function.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
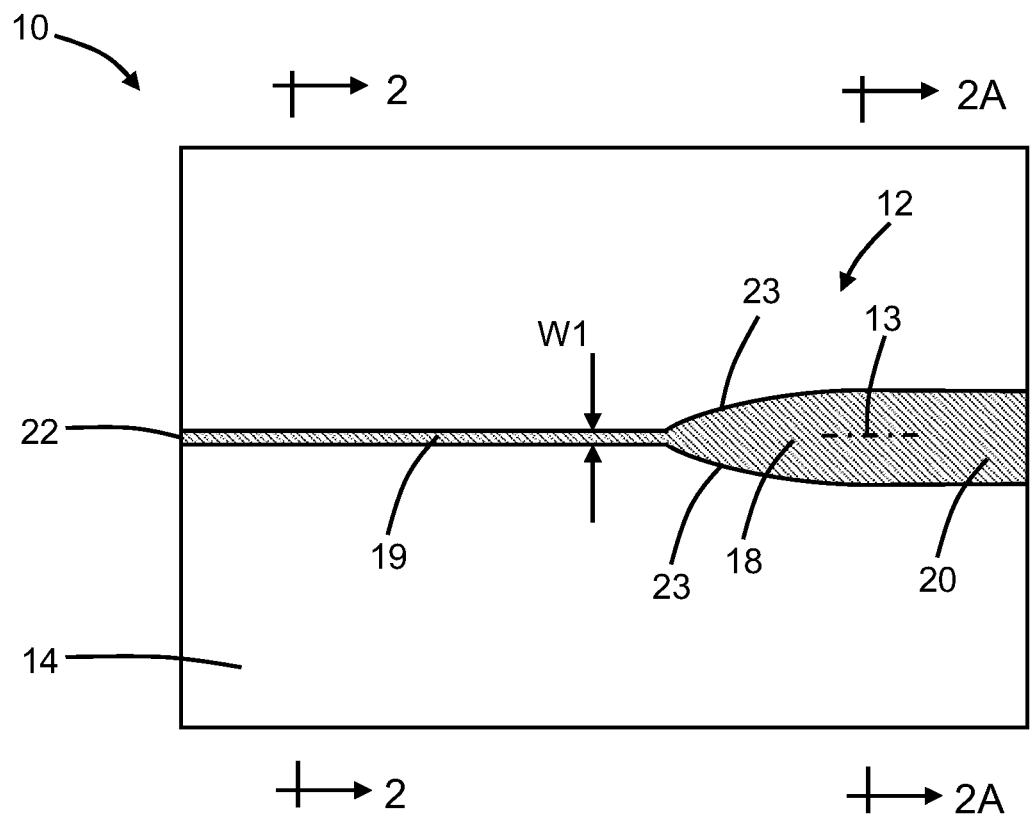
FIG. 1 is a top view of a structure at an initial fabrication stage of a processing method in accordance with embodiments of the invention.
Figure 2:
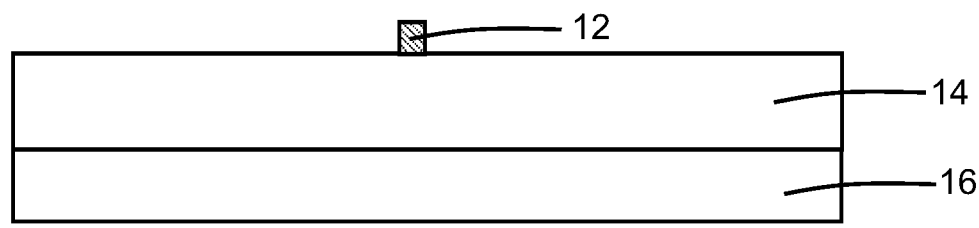
FIG. 2 is a cross-sectional view taken generally along line 2-2 in FIG. 1.
Figure 2A:
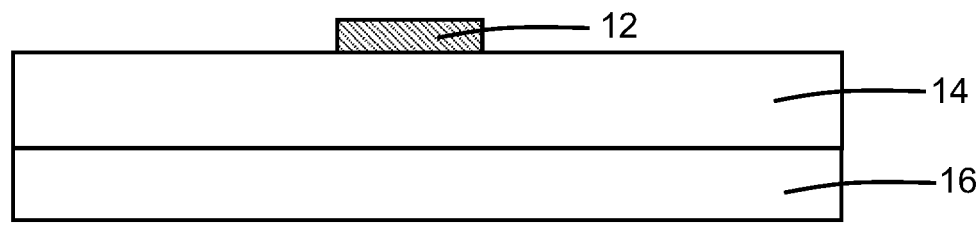
FIG. 2A is a cross-sectional view taken generally along line 2A-2A in FIG. 1.

With reference to FIGS. 1, 2, 2A and in accordance with embodiments of the invention, a structure 10 for an edge coupler includes a waveguide core 12 that is positioned over a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate, and the dielectric layer 14 may separate the waveguide core 12 from the substrate 16. In an alternative embodiment, an additional dielectric layer comprised of a dielectric material, such as silicon dioxide, may be positioned between the dielectric layer 14 and the waveguide core 12.

The waveguide core 12 may be aligned along a longitudinal axis 13. The waveguide core 12 may include an inverse taper 18, a section 20 connected to the inverse taper 18, and a section 19 connected by the inverse taper 18 to the section 20. An inverse taper refers to a tapered section of a waveguide core characterized by a gradual increase in width along a mode propagation direction. The section 19 of the waveguide core 12 is terminated by an end surface 22. In an alternative embodiment, the section 19 may be omitted such that the inverse taper 18 includes a rounded tip defining the end surface 22 terminating the waveguide core 12. The section 20 of the waveguide core 12 may be connected to other optical components on the photonics chip.

The waveguide core 12 has opposite side edges 23 that converge at the end surface 22. The waveguide core 12 has a width W1 that may be measured as a perpendicular distance between the opposite side edges 23. The width W1 of the section 19 may be lengthwise constant such that the section 19 is non-tapered or straight. The width W1 of the section 20 may also be lengthwise constant such that the section 20 is non-tapered or straight.

The inverse taper 18 defines a tapered section of the waveguide core 12. The width W1 of the inverse taper 18 may increase with increasing distance along the longitudinal axis 13 from the end surface 22 based on a non-linear function, such as a quadratic, cubic, parabolic, sine, cosine, Bezier, or exponential function. The inverse taper 18 has a rounded tip that is overlaid on the section 20. The inverse taper 18 is characterized by a curvature that is most pronounced adjacent to rounded tip at the interface with the section 19, and that asymptotically approaches the constant width W1 of the section 20 with increasing distance from the rounded tip.

The waveguide core 12 may be comprised of a dielectric material, such as silicon nitride, having a refractive index greater than the refractive index of silicon dioxide. In an alternative embodiment, the waveguide core 12 may be comprised of silicon oxynitride. In an embodiment, the waveguide core 12 may be formed by depositing a layer of its constituent material by chemical vapor deposition on the dielectric layer 14 and patterning the deposited layer by lithography and etching processes. In an alternative embodiment, the waveguide core 12 may be comprised of silicon, which also has a refractive index greater than the refractive index of silicon dioxide, and may be patterned from a device layer of a silicon-on-insulator substrate. In alternative embodiments, other materials, such as a polymer or a III-V compound semiconductor, may be used to form the waveguide core 12. In an alternative embodiment, a slab layer may be connected to a lower portion of the waveguide core 12. The slab layer may be formed when the waveguide core 12 is patterned, and the slab layer, which is positioned on the dielectric layer 14, has a thickness that is less than the thickness of the waveguide core 12.

Figure 3:
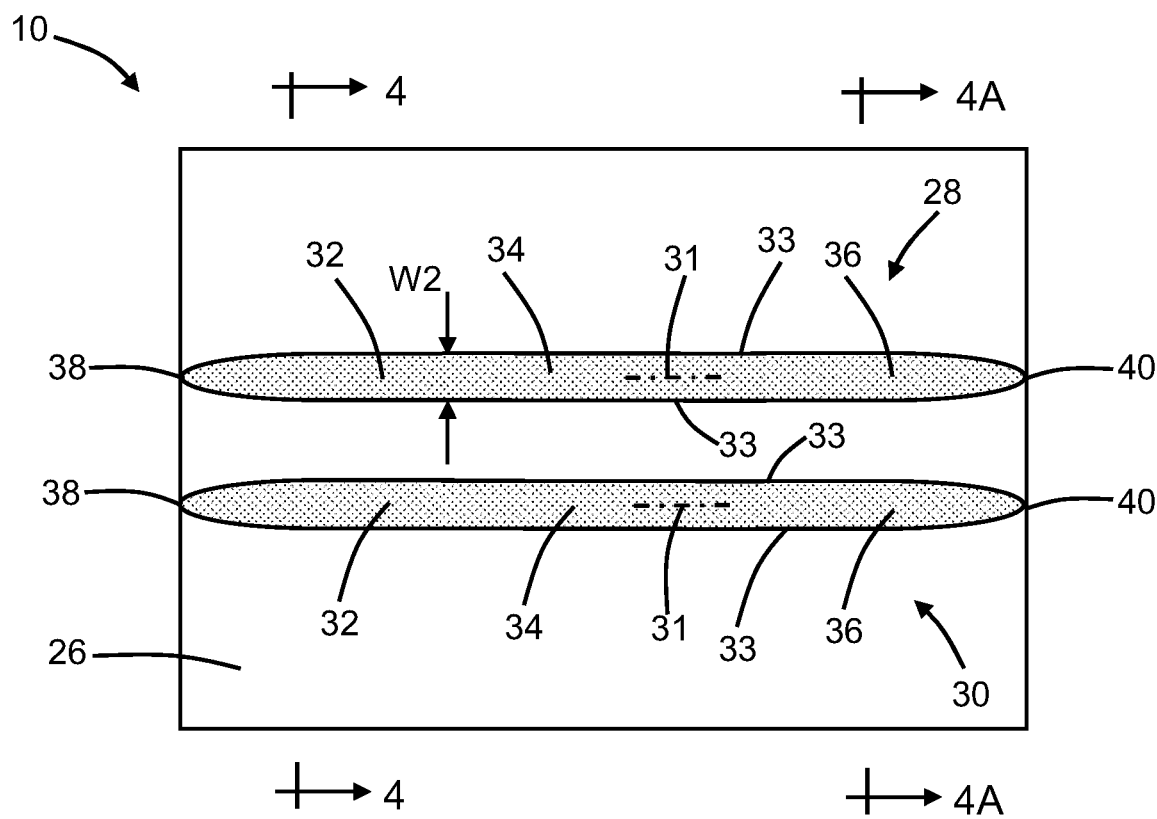
FIG. 3 is a top view of the structure at a fabrication stage of the processing method subsequent to FIG. 1.
Figure 4:
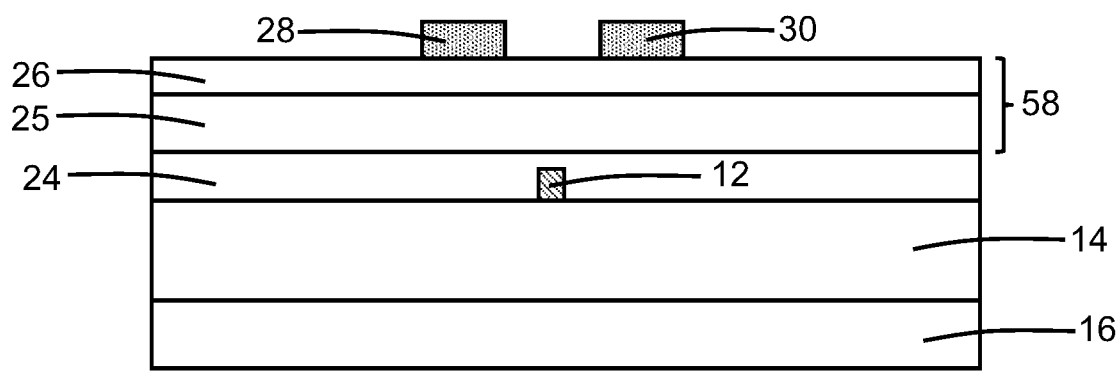
FIG. 4 is a cross-sectional view taken generally along line 4-4 in FIG. 3.
Figure 4A:
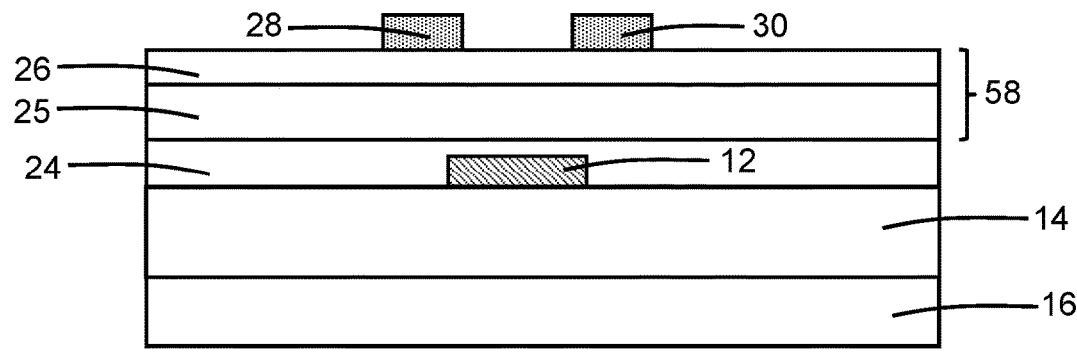
FIG. 4A is a cross-sectional view taken generally along line 4A-4A in FIG. 3.

With reference to FIGS. 3, 4, 4A in which like reference numerals refer to like features in FIGS. 1, 2, 2A and at a subsequent fabrication stage, dielectric layers 24, 25, 26 are formed over the waveguide core 12. The waveguide core 12 is embedded in the dielectric layer 24 because the dielectric layer 24 is thicker than the height of the waveguide core 12. The thickness of the dielectric layer 24 and the height of the waveguide core 12 may be adjustable variables. The dielectric layers 24, 25, 26 may be comprised of a dielectric material, such as silicon dioxide, tetraethylorthosilicate silicon dioxide, or fluorinated-tetraethylorthosilicate silicon dioxide. The dielectric material constituting the dielectric layer 24, as well as the dielectric materials of dielectric layers 25, 26, may have a lower refractive index than the material constituting the waveguide core 12. The dielectric layers 25, 26 may be included in a back-end-of-line stack 58.

The edge coupler may include additional waveguide cores 28, 30 that are formed in a level of the back-end-of-line stack 58 and that have a laterally-spaced juxtaposed arrangement on the dielectric layer 26. Each of the waveguide cores 28, 30 may be lengthwise aligned along a longitudinal axis 31. Each of the waveguide cores 28, 30 is truncated by a rounded tip 38 at one end and by a rounded tip 40 at the opposite end. Each of the waveguide cores 28, 30 may include an inverse taper 32, a section 34, and a taper 36 that are arranged along the longitudinal axis 31 between the rounded tips 38, 40. The section 34 is longitudinally positioned between the inverse taper 32 and the taper 36. In an embodiment, the section 34 may be adjoined to the inverse taper 32, and the section 34 may also be adjoined to the taper 36. In an embodiment, the longitudinal axis 31 of the waveguide core 28 and the longitudinal axis 31 of the waveguide core 30 may be oriented with a parallel alignment.

The waveguide core 12 may be positioned in a vertical direction between a portion of each of the waveguide cores 28, 30 and the substrate 16. In an embodiment, the taper 36 of the waveguide core 28 may partially overlap with the waveguide core 12 at one of its side edges 23, and the taper 36 of the waveguide core 30 may partially overlap with the waveguide core 12 at the other of its side edges 23. In an alternative embodiment, the waveguide cores 28, 30 and the waveguide core 12 may have a non-overlapping arrangement. The waveguide core 28 and the waveguide core 30 each have opposite side edges 33, a width W2 between the opposite side edges 33, and a length between the opposite rounded tips 38, 40. The width W2 of each section 34 may be lengthwise constant and non-tapered sections of the waveguide cores 28, 30.

The inverse taper 32 defines a tapered section of each of the waveguide cores 28, 30. In an embodiment, the width W2 of each inverse taper 32 may increase with increasing distance along the longitudinal axis 31 from the rounded tip 38 based on a non-linear function. In an embodiment, the non-linear function may be a quadratic function. In an alternative embodiment, the non-linear function may be a cubic function. In alternative embodiments, the non-linear function may be a parabolic, sine, cosine, Bezier, or exponential function. Each inverse taper 32 is characterized by a curvature that is most pronounced adjacent to the rounded tip 38, and that asymptotically approaches the constant width W2 of the section 34 with increasing distance from the rounded tip 38.

The taper 36 also defines a tapered section of each of the waveguide cored 28, 30. In an embodiment, the width W2 of each taper 36 may decrease with decreasing distance along the longitudinal axis 31 from the rounded tip 40 based on a non-linear function. In an embodiment, the non-linear function may be a quadratic function. In an alternative embodiment, the non-linear function may be a cubic function. In alternative embodiments, the non-linear function may be a parabolic, sine, cosine, Bezier, or exponential function. Each taper 36 is characterized by a curvature that is most pronounced adjacent to the rounded tip 40, and that asymptotically approaches the constant width W2 of the section 34 with increasing distance from the rounded tip 40.

The waveguide cores 28, 30 may be comprised of a dielectric material, such as silicon nitride, having a refractive index that is greater than the refractive index of silicon dioxide. In an alternative embodiment, the waveguide cores 28, 30 may be comprised of aluminum nitride or silicon oxynitride. In an embodiment, waveguide cores 28, 30 may be formed by depositing a layer of their constituent material by chemical vapor deposition on the dielectric layer 26 and patterning the deposited layer by lithography and etching processes. In an alternative embodiment, a slab layer may be connected to a lower portion of each of the waveguide cores 28, 30. The slab layer may be formed when the waveguide cores 28, 30 are patterned, and the slab layer, which is positioned on the dielectric layer 26, has a thickness that is less than the thickness of the waveguide cores 28, 30. In an alternative embodiment, the slab layer may connect the waveguide cores 28, 30.

Figure 5:
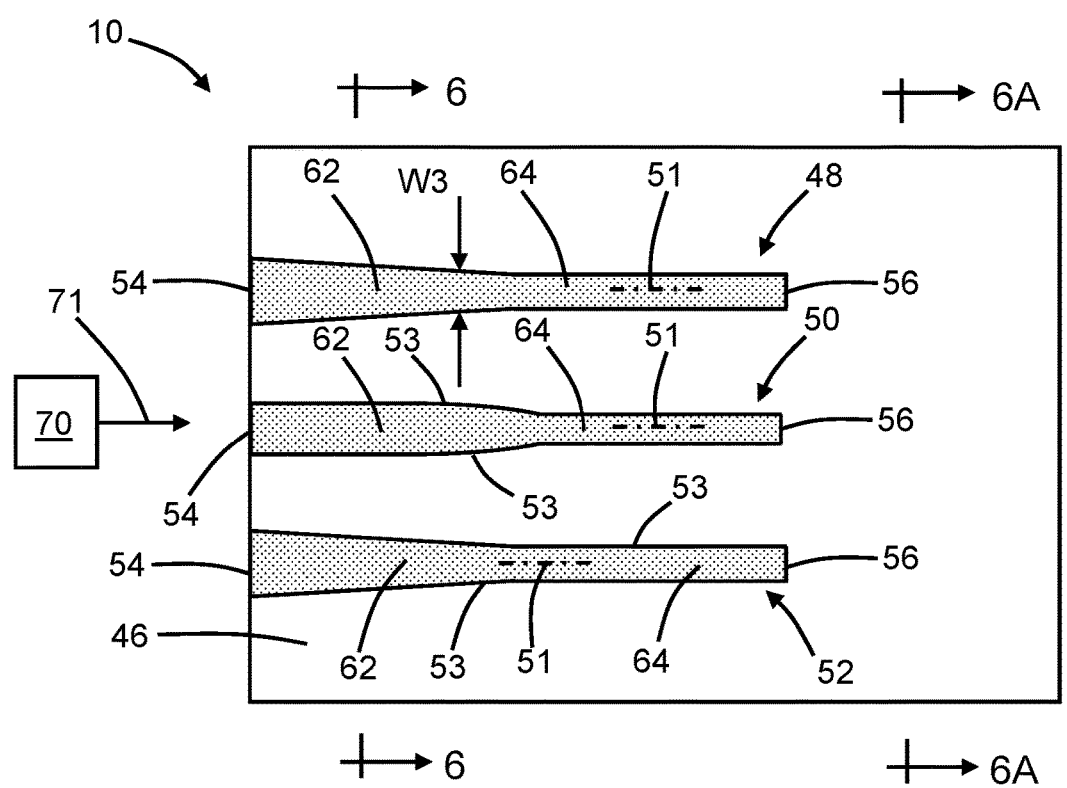
FIG. 5 is a top view of the structure at a fabrication stage of the processing method subsequent to FIG. 3.
Figure 6:
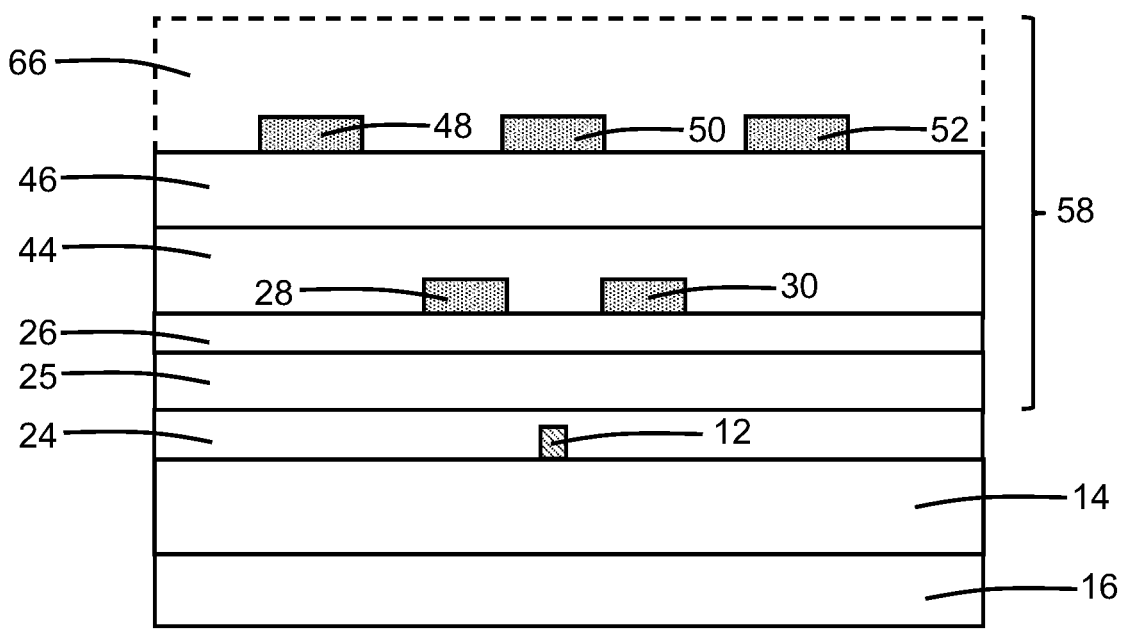
FIG. 6 is a cross-sectional view taken generally along line 6-6 in FIG. 5.
Figure 6A:
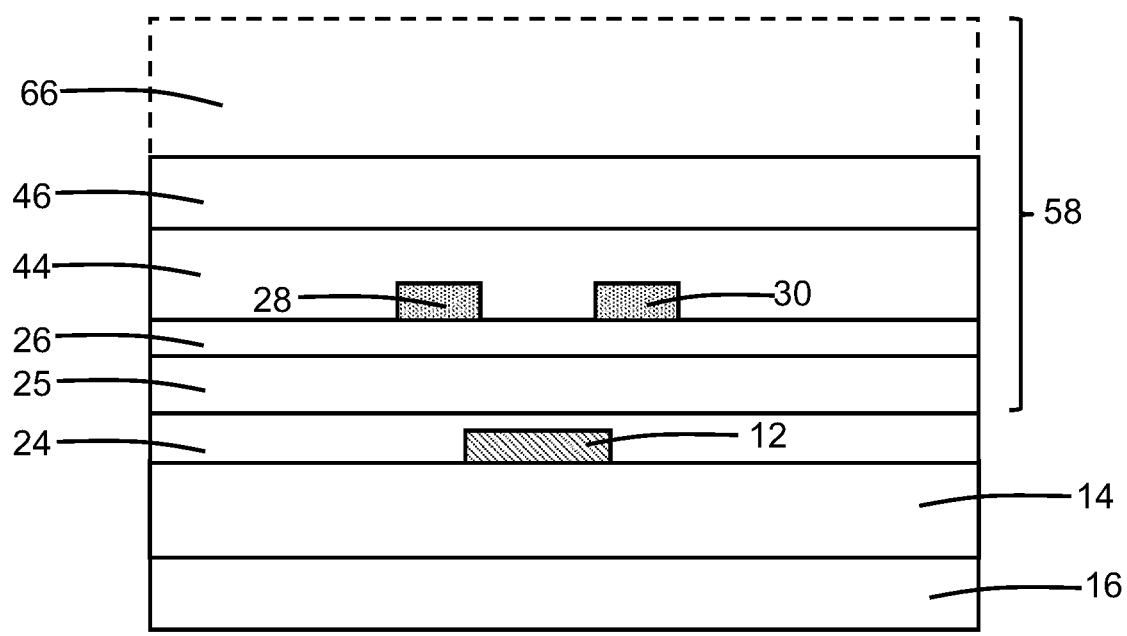
FIG. 6A is a cross-sectional view taken generally along line 6A-6A in FIG. 5.

With reference to FIGS. 5, 6, 6A in which like reference numerals refer to like features in FIGS. 3, 4, 4A and at a subsequent fabrication stage, dielectric layers 44, 46 of the back-end-of-line stack 58 are formed over the waveguide cores 28, 30. The waveguide cores 28, 30 are embedded in the dielectric layer 44 because the dielectric layer 44 is thicker than the height of the waveguide core 28, 30. The thickness of the dielectric layer 44 and the height of the waveguide cores 28, 30 may be adjustable variables. The dielectric layers 44, 46 may be comprised of a dielectric material, such as silicon dioxide, tetraethylorthosilicate silicon dioxide, or fluorinated-tetraethylorthosilicate silicon dioxide. The dielectric material constituting the dielectric layer 44, as well as the dielectric material constituting the dielectric layer 46, may have a lower refractive index than the material constituting the waveguide cores 28, 30.

The edge coupler may include additional waveguide cores 48, 50, 52 that are formed in a level of the back-end-of-line stack 58 and that have a laterally-spaced juxtaposed arrangement on the dielectric layer 46. The level of the back-end-of-line stack 58 including the waveguide cores 48, 50, 52 is a different level of the back-end-of-line stack 58 from the level including the waveguide cores 28, 30. The waveguide cores 28, 30 may be positioned in a vertical direction between the waveguide cores 48, 50, 52 and the substrate 16.

Each of the waveguide cores 48, 50, 52 may be lengthwise aligned along a longitudinal axis 51. The waveguide cores 48, 50, 52, which are truncated, extend longitudinally between an end surface 54 and an end surface 56 opposite to the end surface 54. In an embodiment, the longitudinal axes 51 of the waveguide cores 48, 50, 52 may have a parallel alignment. Each of the waveguide cores 48, 50, 52 may include a taper 62 and a section 64 that are longitudinally positioned between the opposite end surfaces 54, 56. In an embodiment, the section 64 may be adjoined to the taper 62. The taper 62 defines a tapered section of each of the waveguide cores 48, 50, 52.

The waveguide core 50 is laterally positioned between the waveguide core 48 and the waveguide core 52. Each of the waveguide cores 48, 50, 52 has opposite side edges 53, a width W3 that may be measured as a perpendicular distance between the opposite side edges 53, and a length between the end surfaces 54, 56. The width W3 of each section 64 may be lengthwise constant to define a non-tapered section. The width W3 of the taper 62 of the waveguide core 48 and the taper 62 of the waveguide core 52 decreases with increasing distance along the longitudinal axis 51 from the end surface 54 based on a linear function. In contrast, the width W3 of the taper 62 of the waveguide core 50 may decrease with increasing distance along the longitudinal axis 51 from the end surface 54 based on a non-linear function. In an embodiment, the non-linear function may be a quadratic function. In an alternative embodiment, the non-linear function may be a cubic function. In alternative embodiments, the non-linear function may be a parabolic, sine, cosine, Bezier, or exponential function. The waveguide core 50 is characterized by a curvature that is most pronounced adjacent to the interface between the taper 62 and section 64, and that asymptotically approaches the constant width W3 of the section 64 with increasing distance from the end surface 54.

The waveguide cores 48, 50, 52 may be comprised of a dielectric material, such as silicon nitride, having a refractive index that is greater than the refractive index of silicon dioxide. In an alternative embodiment, the waveguide cores 48, 50, 52 may be comprised of aluminum nitride or silicon oxynitride. In an embodiment, waveguide cores 48, 50, 52 may be formed by depositing a layer of their constituent material by chemical vapor deposition on the dielectric layer 46 and patterning the deposited layer by lithography and etching processes. In an alternative embodiment, a slab layer may be connected to a lower portion of each of the waveguide cores 48, 50, 52. The slab layer may be formed when the waveguide cores 48, 50, 52 are patterned, and the slab layer, which is positioned on the dielectric layer 46, has a thickness that is less than the thickness of the waveguide cores 48, 50, 52. In an alternative embodiment, the slab layer may connect the waveguide cores 48, 50, 52.

Additional dielectric layers 66 (diagrammatically shown in dashed lines), including a dielectric layer providing a moisture barrier, of the back-end-of-line stack 58 may be formed over the waveguide cores 48, 50, 52.

Light (e.g., laser light) may be directed in a mode propagation direction 71 from a light source 70 toward the edge coupler. The light may have a given wavelength, intensity, mode shape, and mode size, and the edge coupler may provide spot size conversion for the light. In an embodiment, the light source 70 may be a single-mode optical fiber placed adjacent to the edge coupler. In an alternative embodiment, the light source 70 may be a semiconductor laser placed adjacent to the edge coupler, and the semiconductor laser may be attached inside a cavity formed in the substrate 16.

The structure 10, in any of its embodiments described herein, may be integrated into a photonics chip that includes electronic components and additional optical components. For example, the electronic components may include field-effect transistors that are fabricated by CMOS processing.

The edge coupler featuring non-linear tapered sections (e.g., non-linear tapers and non-linear inverse tapers) in the back-end-of-line stack 58 may function to reduce leakage loss from the edge coupler to the substrate 16, even in the absence of an undercut in the substrate 16 beneath the edge coupler. The leakage loss reduction may permit the elimination of a substrate undercut as a leakage loss measure and may result in an undercut-free, solid substrate 16 beneath the waveguide cores 26, 28 and the waveguide cores 48, 50, 52. Eliminating the undercut simplifies the process flow for forming the edge coupler, as well as potential mechanical issues resulting from removing a portion of the substrate 16 under the dielectric layer 14 and thereby eliminating a portion of the mechanical support. The leakage loss reduction for light with either transverse electric polarization mode or transverse magnetic polarization mode may be significant in comparison with a conventional edge coupler that lacks non-linear tapers and/or non-linear inverse tapers in the back-end-of-line stack. The edge coupler may be formed with a reduced footprint due to the addition of the non-linear tapered sections to the waveguide cores 26, 28 and the waveguide cores 48, 50, 52. The edge coupler may also be characterized by a reduced insertion loss due to the addition of the non-linear tapered sections to the waveguide cores 26, 28 and the waveguide cores 48, 50, 52.

Figure 7:
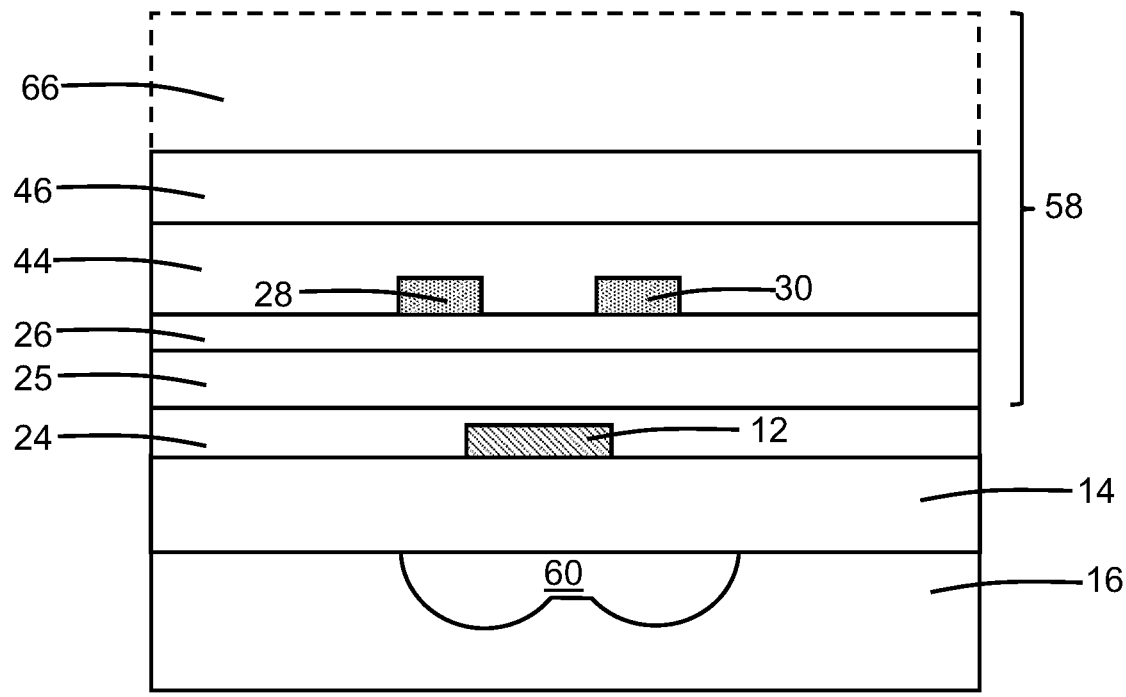
FIG. 7 is a cross-sectional view of a structure in accordance with alternative embodiments of the invention.

With reference to FIG. 7 and in accordance with alternative embodiments of the invention, an undercut 60 may be formed in the substrate 16. The waveguide cores 28, 30 and the waveguide cores 48, 50, 52 may overlap with the undercut 60 in the substrate 16. The undercut 60 may be formed by patterning pilot openings penetrating through the dielectric layer 14, and then etching the substrate 16 with access provided by the pilot openings using an isotropic etching process characterized by both lateral and vertical etching components. In an embodiment, the undercut 60 may be sealed. The undercut 60 may provide an additional reduction in the leakage loss of light from the edge coupler to the substrate 16.

Figure 8:
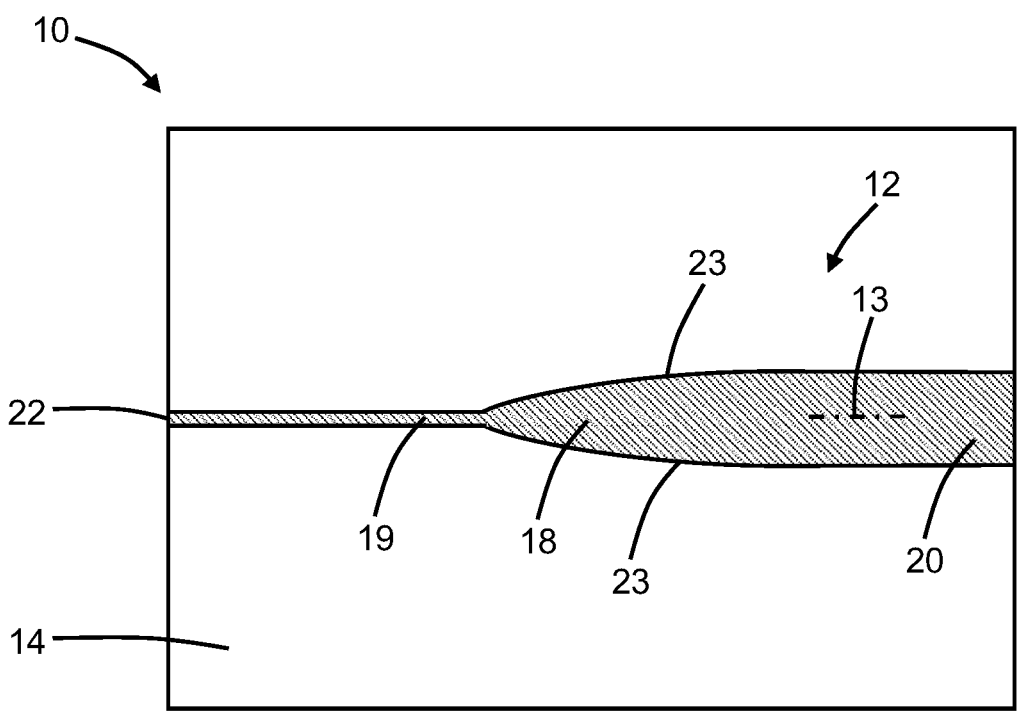
FIGS. 8-10 are top views of a structure at successive fabrication stages in accordance with alternative embodiments of the invention.

With reference to FIG. 8 and in accordance with alternative embodiments of the invention, the inverse taper 18 of the waveguide core 12 may be lengthened such that the inverse taper 18 is closer to the end surface 22 and the section 19 may be concomitantly shortened.

Figure 9:
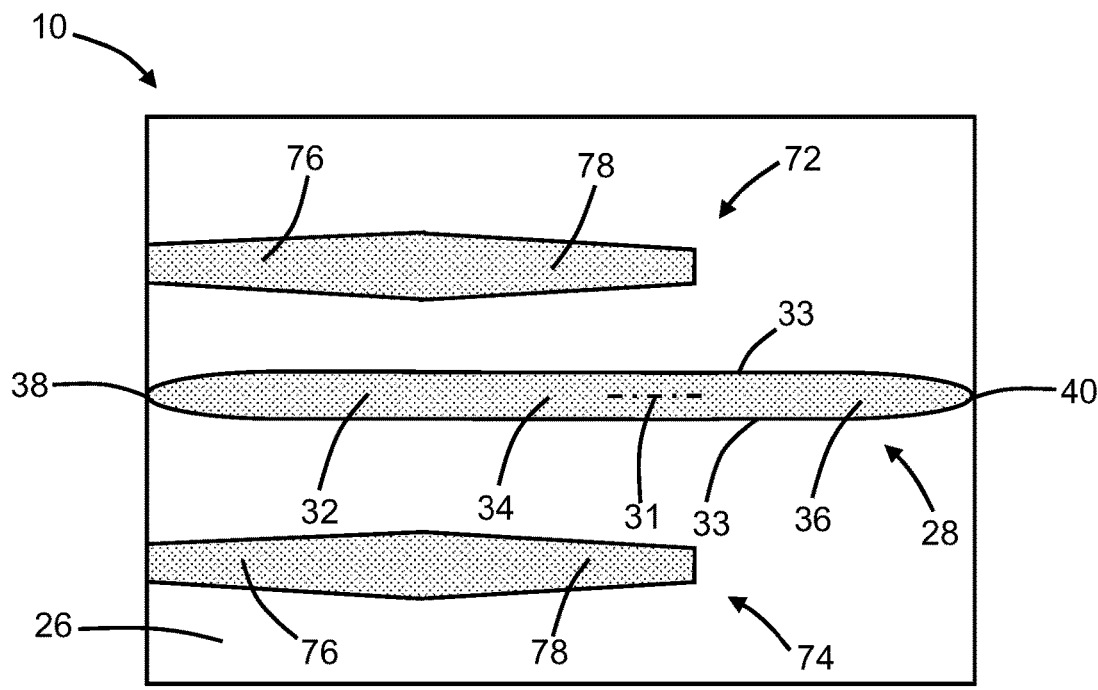

With reference to FIG. 9 in which like reference numerals refer to like features in FIG. 8 and at a subsequent fabrication stage, the level of the back-end-of-line stack 58 including the waveguide cores 28, 30 may be modified by eliminating the waveguide core 30, shifting the waveguide core 28 to a central position in the structure 10, and adding waveguide cores 72, 74. The shifted position of the waveguide core 28 results in an overlapping relationship between the taper 36 of the waveguide core 28 and a portion of the inverse taper 18 of the waveguide core 12. The waveguide core 28 and the waveguide cores 72, 74 are arranged in a juxtaposed relationship with the waveguide core 28 laterally positioned between the waveguide core 72 and the waveguide core 74. Each of the waveguide cores 72, 74 includes an inverse taper 76 and a taper 78 that are longitudinally positioned with a back-to-back arrangement and that respectively vary in width based on a linear function.

Figure 10:
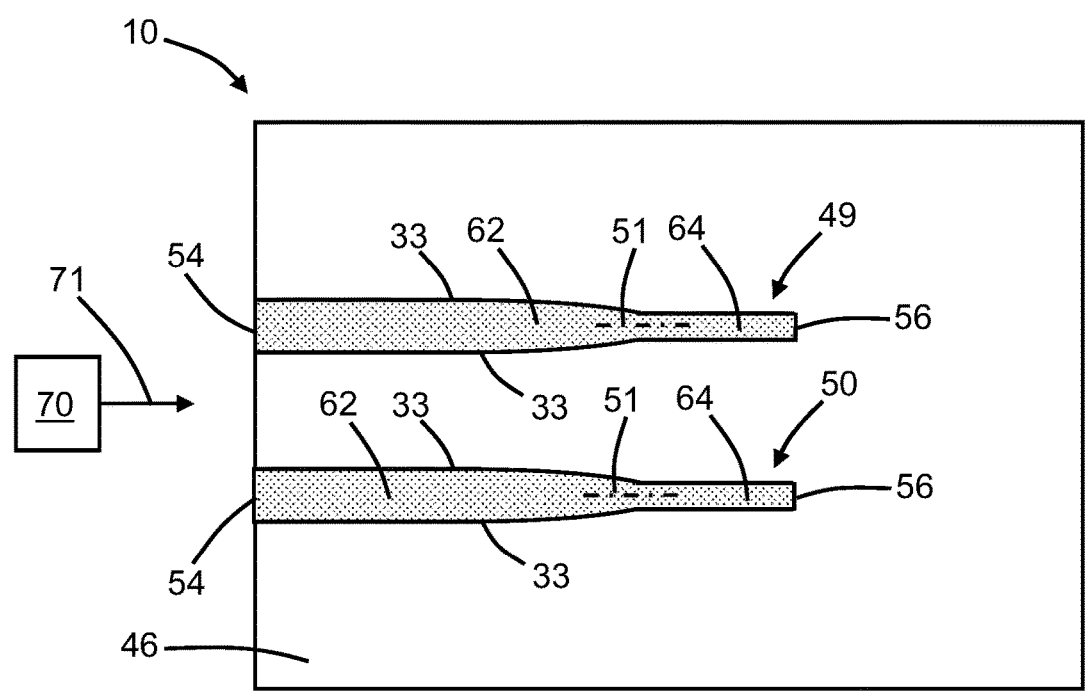

With reference to FIG. 10 in which like reference numerals refer to like features in FIG. 9 and at a subsequent fabrication stage, the level of the back-end-of-line stack 58 including the waveguide cores 48, 50, 52 may be modified by eliminating the waveguide core 48 and the waveguide core 52. A waveguide core 49 that is identical or substantially identical to the waveguide core 50 may be added. In that regard, the added waveguide core 49 includes the taper 62 having a width that decreases with increasing distance from the end surface 54 based on a non-linear function. The waveguide cores 49, 50 are positioned with a laterally-spaced juxtaposed arrangement on the dielectric layer 46.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for an edge coupler, the structure comprising:
    a substrate; and
    a back-end-of-line stack located over the substrate, the back-end-of-line stack including a first waveguide core having a first longitudinal axis and a first tapered section with a first width that varies with position along the first longitudinal axis based on a first non-linear function and a second tapered section with a second width that varies with position along the first longitudinal axis based on a second non-linear function, the first tapered section including a first rounded tip, the second tapered section including a second rounded tip spaced along the first longitudinal axis from the first rounded tip, the first width increasing with increasing distance from the first rounded tip, and the second width decreasing with decreasing distance from the second rounded tip.

2. The structure of claim 1 wherein the first non-linear function is a quadratic function.

3. The structure of claim 1 wherein the first non-linear function is a cubic function.

4. The structure of claim 1 wherein the back-end-of-line stack includes a second waveguide core, and the second waveguide core has a second longitudinal axis and a tapered section with a width that varies with position along the second longitudinal axis based on a third non-linear function.

5. The structure of claim 4 wherein the first waveguide core is positioned in a first level of the back-end-of-line stack, the second waveguide core is positioned in a second level of the back-end-of-line stack, and the first level differs from the second level.

6. The structure of claim 4 wherein the first waveguide core and the second waveguide core are positioned in a level of the back-end-of-line stack.

7. The structure of claim 6 wherein the first waveguide core and the second waveguide core have a juxtaposed relationship within the level of the back-end-of-line stack.

8. The structure of claim 7 wherein the first longitudinal axis of the first waveguide core is aligned parallel to the second longitudinal axis of the second waveguide core.

9. The structure of claim 1 wherein the substrate includes an undercut, and the first waveguide core overlaps with the undercut in the substrate.

10. The structure of claim 1 wherein the substrate is solid beneath the first waveguide core.

11. The structure of claim 1 wherein the first waveguide core comprises silicon nitride.

12. The structure of claim 1 wherein the first waveguide core includes a non-tapered section, and the first rounded tip of the first tapered section of the first waveguide core is overlaid on the non-tapered section.

13. The structure of claim 1 wherein the back-end-of-line stack includes a second waveguide core, the second waveguide core has a second longitudinal axis and a tapered section with a width that varies with position along the second longitudinal axis based on a linear function, and the first waveguide core and the second waveguide core have a juxtaposed relationship.

14. A method of forming a structure for an edge coupler, the method comprising:
forming a first waveguide core in a back-end-of-line stack that is located over a substrate, wherein the first waveguide core has a first longitudinal axis and a first tapered section with a first width that varies with position along the first longitudinal axis based on a first non-linear function,
wherein the first waveguide core includes a second tapered section with a second width that varies with position along the first longitudinal axis based on a second non-linear function, the first tapered section includes a first rounded tip and the second tapered section includes a second rounded tip spaced along the first longitudinal axis from the first rounded tip, the first width increases with increasing distance from the first rounded tip, and the second width decreases with decreasing distance from the second rounded tip.

15. The method of claim 14 further comprising:
forming a second waveguide core in the back-end-of-line stack,
wherein the second waveguide core has a second longitudinal axis and a tapered section with a width that varies with position along the second longitudinal axis based on a third non-linear function.

16. The method of claim 15 wherein the first waveguide core is positioned in a first level of the back-end-of-line stack, the second waveguide core is positioned in a second level of the back-end-of-line stack, and the first level differs from the second level.

17. The method of claim 15 wherein the first waveguide core and the second waveguide core are positioned with a juxtaposed relationship in a level of the back-end-of-line stack.

18. The structure of claim 5 wherein the first waveguide core comprises silicon nitride, and the second waveguide core comprises silicon nitride.

19. The structure of claim 5 wherein the first waveguide core comprises silicon nitride, and the second waveguide core comprises aluminum nitride or silicon oxynitride.

20. The structure of claim 5 wherein the first waveguide core comprises aluminum nitride or silicon oxynitride, and the second waveguide core comprises aluminum nitride or silicon oxynitride.

* * * * *